United States Patent [19]
Carosello

[11] 4,081,392
[45] Mar. 28, 1978

[54] INSULATION BLOCK AND METHOD OF MAKING SAME
[75] Inventor: Theodore F. Carosello, Painesville, Ohio
[73] Assignee: Progressive Research Products, Inc., Painesville, Ohio
[21] Appl. No.: 803,529
[22] Filed: Jun. 6, 1977
[51] Int. Cl.² ............................................. C04B 43/00
[52] U.S. Cl. .................................. 252/62; 106/40 R; 106/75; 260/30.8 DS
[58] Field of Search ................ 252/62; 106/40 R, 75; 260/30.8 DS

[56] References Cited
U.S. PATENT DOCUMENTS

| | | | |
|---|---|---|---|
| 3,468,994 | 9/1969 | Gilbert | 264/94 |
| 3,682,667 | 8/1972 | Roberts et al. | 252/62 X |
| 3,719,510 | 3/1973 | Temple et al. | 106/40 R |

*Primary Examiner*—Harris A. Pitlick
*Attorney, Agent, or Firm*—Baldwin, Egan, Walling & Fetzer

[57] ABSTRACT

A known expanded silicate-based aggregate described in the U.S. Pat. No. 3,719,510, granted Mar. 6, 1973 to Ralph E. Temple and William T. Gooding is mixed with a slurry consisting of 5 to 8 percent polyvinyl chloride in a water-free solvent comprising 15 percent dimethylsulfoxide and 85 percent methylethyl ketone to provide a pourable and settable insulation. Blocks of such insulation are lightweight but will not break down upon handling, are non-combustible, have a high heat insulation factor, and are not attacked by the acids or distillates commonly used in forming a roof covering.

2 Claims, No Drawings

INSULATION BLOCK AND METHOD OF MAKING SAME

BACKGROUND OF THE INVENTION

There is a need today for an insulation block material which is light in weight and similar to foamed polystyrene but having great advantages over such material. It is therefore an object of the present invention to provide this material in an inexpensive manner.

This invention uses a preparation of expanded silicate-based aggregates described in U.S. Pat. No. 3,719,510, granted Mar. 6, 1973 to Ralph E. Temple, and William T. Gooding, Jr. and assigned to Diamond Shamrock Corporation of Cleveland, Ohio. This aggregate material of U.S. Pat. No. 3,719,510 has previously been used only as loose insulation, fireproof wallboard and insulating blocks using cementitious binders, pipe covering for high temperatures, ceiling tiles, fireproof cladding of steel structures, filler for marine decks, cement blocks for non-bearing fire walls and similar structural uses. The present invention presents the discovery of this silicate-based aggregate as a highly efficient material for making a lightweight insulation block when mixed with a slurry consisting of 5 to 8 percent polyvinyl chloride dissolved in a mixture of 15% dimethylsulfoxide and 85% methyl ethyl ketone.

This expanded silicate-based aggregate is described and claimed in U.S. Pat. No. 3,719,510, granted Mar. 6, 1973 to Ralph E. Temple and William T. Gooding and assigned to Diamond Shamrock Corporation of Cleveland, Ohio. This insoluble aggregate is formed by:

(A) mixing, at a temperature less than boiling, an aqueous alkali metal silicate having an alkali metal oxide: silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40% by weight and the amount of alkali metal silicate solids being 40–90% by weight, dry basis, of the total resultant aggregate;

(B) admixing prior to the time when the anhydrous alklai metal silicate becomes substantially hydrated, two insolubilizing compounds as follows:

(1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and (2) a secondary insolubilizer capable of reacting with the silicate portion of the alkali metal silicate at temperatures used in expanding same, the amount used being that sufficient to render the expanded aggregate water-insoluble, the total amount of insolubilizers used being less than the stoichiometric amount required for total reaction with the alkali metal silicate present;

(C) continuing mixing until the components will not separate on standing at temperatures up to boiling;

(D) curing the mixed composition at temperatures up to boiling until the anhydrous alkali metal silicate has become substantially hydrated and the primary insolubilizer reacted;

(E) cooling the composition to a grindable solid;

(F) grinding the composition into discrete non-adherent particles suitable for expansion and (G) rapidly expanding the particles and causing the secondary solubilizer to react by exposure to temperatures of from about 800°–1800° F to provide an insoluble lightweight aggregate which is free flowing in small clusters, having an average density in loose bulk of 2.5 to 3.5 pounds per cubic foot, and having a water absorption of 1.5 gallons per cubic foot, and this insoluble lightweight aggregate being sized substantially through a screen 10 meshes per inch in two directions.

This material when used as taught in this invention will form a very valuable lightweight insulating block.

This expanded silicate-based aggregate material, consisting of fines and up to everything which passes the 10 mesh screen is then subjected to the following steps:

(1) Stir into the starting material which is a mass of said fine silicate-based dry aggregate material produced as taught in U.S. Pat. No. 3,719,510 and screened through 10 mesh screen, a slurry consisting of a solution at a temperature between ambient and 170° F. of five to eight percent polyvinyl chloride in a solvent comprising 15% dimethylsulfoxide and 85% methyl ethyl ketone to provide a paste substantially saturated with said silicate-based aggregate. No water is permitted in the solvent used for this slurry. The starting material of silicate-based aggregate may be at any temperature up to about 165° F. Food grade PVC powder is used and it is mechanically stirred sufficiently to keep the PVC material from sticking and burning. When said slurry equals from about 18 percent to about 25 percent by weight of said starting material, and said mixed batch changes from a white color to a gray color, then one knows that the slurry material is saturated with the silicate-based aggregate. The higher percent of slurry is related to an aggregate material higher in fines.

The above described paste material may be troweled in place but more commonly is poured into a suitable mold and then dried by air or by heat at any suitable temperature. Obviously, the higher the drying temperature, the shorter the time will be. This results in an insulation block which weighs about 1 pound per square foot of a one inch thick block. The final product is not only light in weight but is non-combustible and has a very high heat insulation factor. It will stand rough handling without breaking. It will not absorb water when the insulation is in place. It is compatible with tars and epoxy resins and is not attacked by such coatings. The insulation blocks of this invention are not attacked by the acids or distillates commonly used in constructing a roof.

What is claimed is:

1. A method of forming a highly efficient insulating block consisting of taking an expanded insoluble aggregate formed by:

(A) mixing, at a temperature less than boiling, an aqueous alkali metal silicate having an alkali metal oxide: silicon dioxide weight ratio of from about 1:3.0–7.0 with an essentially anhydrous alkali metal silicate within the same weight ratio range, the amount of anhydrous added being that quantity sufficient to give, in combination with the aqueous, a total alkali metal silicate solids content of from 80–40% by weight and the amount of alkali metal silicate solids being 40–90% by weight, dry basis, of the total resultant aggregate;

(B) admixing, prior to the time when the anhydrous alkali metal silicate becomes substantially hydrated, two insolubilizing compounds as follows;
  (1) a primary insolubilizer capable of reacting with the alkali portion of the alkali metal silicate at temperatures less than boiling, the amount used being that sufficient to reduce hygroscopicity of the silicate to the point where caking of the composition prior to expansion but subsequent to grinding is prevented and
  (2) a secondary insolubilizer capable of reacting with the silicate portion of the alkali metal silicate at temperatures used in expanding same, the amount being that sufficient to render the expanded aggregate water-insoluble, the total amount of insolubilizers used being less than the stoichiometric amount required for total reaction with the alkali metal silicate present;
(C) continuing mixture until the components will not separate on standing at temperatures up to boiling;
(D) curing the mixed composition at temperatures up to boiling until the anhydrous alkali metal silicate has become substantially hydrated and the primary insolubilizer reacted;
(E) cooling the composition to a grindable solid;
(F) grinding the composition into discrete nonadherent particles suitable for expansion and
(G) rapidly expanding the particles and causing the secondary solubilizer to react by exposure to temperatures of from about 800°–1800° F., to provide an insoluble lightweight aggregate which is free flowing in small clusters, having an average density in loose bulk of 2.5 to 3.5 pounds per cubic foot, and having a water absorption of 1.5 gallons per cubic foot, said insoluble lightweight aggregate being sized at substantially 10 meshes per inch, this lightweight aggregate material at any temperature up to 165° F. is then mixed with a binder consisting of 5 to 8% of polyvinyl chloride dissolved in a solvent free of water consisting of 15% dimethylsulfoxide and 85% methyl ethyl ketone at a temperature between ambient and 170° F., until the saturated condition of the mixture turns it from white to gray, while mechanically stirring such mixture, thus forming a thick paste, and then pour said mixture into a suitable mold for said insulating block, and then dry said molded form.

2. The insulation block formed by the method of claim 1.

* * * * *